C. I. HALL.
POWER FACTOR METER.
APPLICATION FILED DEC. 5, 1914.
1,240,710.
Patented Sept. 18, 1917.
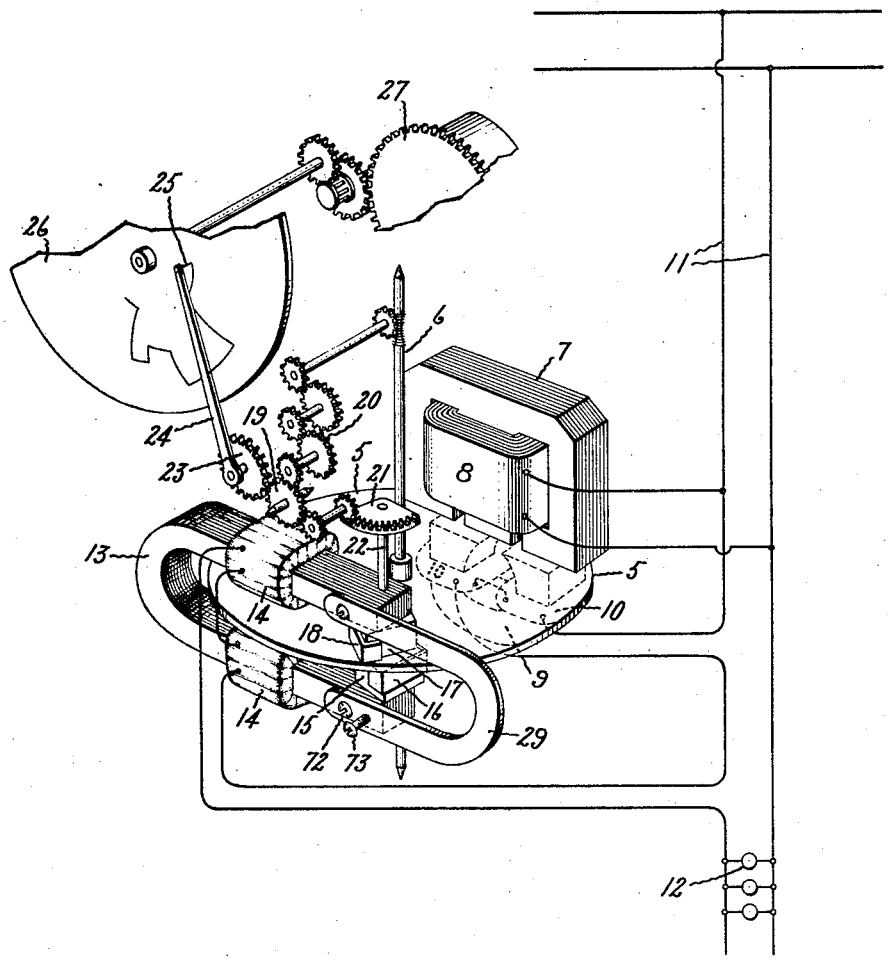
Witnesses:
George H. Tilden
J. Ellis Glen.
Inventor:
Chester I. Hall,
by Albert G. Davis
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

POWER-FACTOR METER.

1,240,710. Specification of Letters Patent. Patented Sept. 18, 1917.

Application filed December 5, 1914. Serial No. 875,627.

*To all whom it may concern:*

Be it known that I, CHESTER I. HALL, a citizen of the United States, residing at Fort Wayne, in the county of Allen, State of Indiana, have invented certain new and useful Improvements in Power-Factor Meters, of which the following is a specification.

My invention relates to power factor meters and particularly to a power factor meter adapted to be satisfactorily employed in the form of a curve drawing instrument.

The object of my invention is to provide a novel and improved power factor meter. A further object of my invention is to provide a power factor meter of such construction that the movable element possesses considerable torque so that the meter can be advantageously employed as a curve drawing instrument. A further object of my invention is to provide a power factor meter for indicating directly the integrated or average power factor over substantial intervals of time.

The novel features which I believe to be patentably characteristic of my invention are definitely indicated in the claims appended hereto. The principle of operation and the construction of a power factor meter embodying my invention will be understood from the following description taken in connection with the accompanying drawings, in which:

The figure is a diagrammatic view in perspective of a curve drawing power factor meter embodying my invention.

The power factor meter of my present invention comprises a movable element adapted to be acted upon by two operatively opposing torques one of which is variable. That is to say, one torque acts positively and the other negatively or as a countertorque. The variable torque is so controlled by the movable element that its value is increased or diminished in accordance with the direction of movement of the movable element and so that it always tends to equal and balance the other torque, thus causing the movable element to come to rest. One of the torques is dependent upon the watt-energy flow in an electric circuit, while the other torque is dependent upon the current flow in the circuit. The meter depends for its action upon the balancing of these two torques. When the power factor of the electric circuit is unity the two torques are exactly balanced with the movable element indicating a power factor of unity. As the power factor varies from unity, assuming the watt-energy flow to remain constant, the torque dependent upon the current flow in the circuit tends to become larger. The increase in the current-dependent torque resulting from a change in the power factor of the circuit is a measure of the change in the power factor, and produces an unbalancing of the two torques with a resultant movement of the movable element. The two torques are thereupon balanced by the movement of the movable element, and the relative change in the values of the torque producing means necessary to effect this balance is a measure of the change in power factor. I prefer to vary the torque dependent on the current flow in the circuit as a function of the movement of the movable element. In the practical embodiment of my invention, I provide an electrodynamometer having torque producing means dependent upon the flow of electric energy in an electric circuit and a variable countertorque producing means dependent upon the current flow in the circuit. These two torque producing means may obviously have certain common mechanical and electrical features combined in a substantially single instrument, or the two torque producing means may be entirely independent units.

The torque and countertorque producing means of my novel and improved power factor meter are adapted to act upon the same movable element. In order to suitably control the speed of movement of the element, damping means is provided therefor. This damping means may be produced magnetically by a permanent magnet or may be produced by the torque producing means of the meter. My novel form of power factor meter thus comprises electrical torque producing means and electrical countertorque producing means adapted to act upon the same movable element and damping means for the element. The torque producing means is dependent upon the watt-energy flow in an electric circuit, and the countertorque producing means is dependent upon the current flow in the circuit and is controlled by suitable connection, preferably reduction gearing, with the movable element.

Movement of the movable element thus varies the value of the countertorque until it equals and balances the torque, whereupon the movable element comes to rest and remains in this position until an unbalancing of the two torques is brought about by another change in the power factor of the circuit. The resulting movement of the movable element due to the unbalancing of the two torques effects an adjustment of the value of the countertorque until the two torques are again equal and the movable element brought to rest, and this operation is repeated whenever the two torques become unbalanced. Movement of the movable element is a measure of the change in the power factor of the circuit, and may be employed in any desired way to secure an indication or record of such change in the power factor. My invention will be better understood by reference to the figure of the accompanying drawing.

The movable element of the meter consists of a disk armature member 5. This armature member is similar to the disk armature employed in the well known induction watthour meter, and consists of a circular metallic disk of conducting material such as copper or aluminum. The armature is secured to a pivotally mounted shaft 6. The torque producing means adapted to act upon the armature 5 are independent and consist of an induction watthour meter element and an induction motor element of the shaded pole type. The induction meter element comprises a laminated magnetic core 7 having a potential coil 8 operatively mounted thereon, and a second oppositely positioned laminated magnet core 9 having two series or current coils 10 operatively mounted thereon. The disk armature 5 is operatively arranged in the usual manner in the air gap between the two magnetic cores 7 and 9. The coils 8 and 10 are electrically connected to the conductors 11 of an alternating current electric installation supplying electric energy to translating devices 12. The torque developed by the induction meter element is thus dependent upon the watt-energy flow in the conductors 11 of the installation.

The induction motor element is arranged to exert a countertorque upon the armature member 5 and is thus adapted to rotate this member in the opposite direction to the direction of rotation caused by the induction meter element. The induction motor element in the form here shown is of the shaded poletype and comprises a U-shaped magnetic member 13 having current carrying coils 14 operatively positioned on each leg thereof. The coils 14 are connected in series in the electric circuit, and thus carry a current dependent upon the current flow in the circuit. A shading pole tip 15 is secured to the lower leg of the U-shaped magnetic member 13 and carries a short-circuited copper coil 16. Directly above the shading pole 15 and separated therefrom by a small air gap is a second pole tip 17 having a short-circuited coil 18 carried thereby. The armature member 5 is arranged to rotate in the air gap between the two pole tips 15 and 17. The pole tip 17 is secured to a rotatable shaft 22 so that it can be moved with respect to the pole tip 15. The arrangement is such that when the two shading coils are electrically in opposition, no torque is developed by the induction motor element, but when the shading coils are electrically in conjunction a maximum torque will be acting upon the disk armature tending to rotate the armature in a direction opposite to the direction of rotation produced by the induction watthour meter element.

A U-shaped bundle of laminations 29 is secured to the ends of the U-shaped magnetic member 13, and constitutes a magnetic shunt around the air gap between the pole tips 15 and 17 and serves to control the flux passing through the armature member 5. This magnetic shunt thus serves as a calibrating member for changing the value of the torque generated by the induction motor element, so that the pointer may be brought to any particular position on the scale. The variation in position and in effect of this shunt varies uniformly the total flux which is used for damping and the torque generated by the motor element, so that for an increased deflection the speed of rotation will be increased proportionally, thus maintaining a constant time interval of operation of the meter. The effect of the magnetic shunt 29 can be varied by means of the adjusting screws 72 and 73. These screws serve to adjust the shunt member 29 with respect to the U-shaped magnetic member 13 so that the reluctance of the magnetic circuit between the adjacent surfaces of these members can be varied. This affords a convenient and simple means for adjusting the effect of the magnetic shunt in the calibration of the meter.

The shaft 6 drives the gear 19 through a train of reduction gearing 20. The gear 19 drives a sector-shaped gear 21 secured to the shaft 22, to which latter the movable pole tip 17 is also secured. Movement of the sector-shaped gear 21 thus varies the position of the pole tip 17 with respect to the pole tip 15. The arrangement is such that rotation of the armature member 5 in a clock-wise direction, as viewed from the top of the meter, effects a clockwise movement of the pole tip 17, thereby increasing the countertorque due to the shaded pole induction motor element, and on the other hand rotation of the armature member 5 in a counter-clockwise direction effects a counterclockwise movement of the pole tip 17 and decreases the countertorque developed by the induction motor element.

The gear 19 may be employed to actuate any suitable indicating or recording means. In the figure, I have shown the gear 19 meshing with a gear 23. A pointer 24 is operatively connected to the gear 23 and carries a marking stylus 25 adapted to sweep across a suitable record chart 26. The marking stylus is in engagement with the record chart and is adapted to impart a graphic indication of its position with respect to the chart. Preferably, the record chart is of specially prepared paper adapted to have a black mark imparted thereon by the passage of a metallic stylus thereover. In the figure, the record chart 26 is driven by a clock-work mechanism 27 and is thus in effect time-actuated.

It will be seen from the foregoing description that the power factor meter illustrated in the figure consists essentially of a standard watthour meter having in place of the usual permanent damping magnets a U-shaped electromagnet with its coil connected in series with the installation, and in place of the standard register a gear train connecting the armature to the recording stylus and to the upper pole tip of the U-shaped magnet. The U-shaped magnet will produce the necessary damping for the disk armature for both directions of rotation, and in addition is adapted to act as a shaded pole motor element to exert upon the armature a countertorque dependent upon the current flow in the installation and controlled by the rotation of the armature. The operation of the meter will, it is believed, be understood from the foregoing discussion and description. The following example, however, may be helpful in further understanding the operation of the meter and the nature of the record or indication obtained thereby.

On unity power factor a displacement of substantially 90 electrical degrees in time phase is obtained between the current and potential fluxes of the induction meter element, which results in generating a torque substantially proportional to the watt-energy flow in the circuit. This torque is exactly counterbalanced by the countertorque derived from the U-shaped magnetic element. Thus, on unity power factor, the two torques are exactly equal and balanced with the disk armature 5 and hence the pointer member 24 in their respective initial positions, indicating unity power factor. If the power factor is suddenly reduced to 70 per cent., assuming the watt-energy flow to remain constant, the countertorque of the induction motor element will increase and dominate the torque of the induction meter element, and the meter disk will be rotated counterclockwise. As this rotation continues, the rotatable pole face is moved to a position where a smaller amount of countertorque is generated, and finally after this movement has continued until the two torques are exactly equal the disk will cease rotating, and the pointer 24 will indicate 70 per cent. power factor.

The meter of my present invention can be constructed to indicate either instantaneous power factors or average power factors over substantially uniform lengths of time. The time interval required for the movable element to come to rest upon the occurrence of a change in the power factor of the circuit can be determined by properly proportioning the gearing between the disk armature 5 and the movable pole tip 17. When the power factor suddenly changes from unity to 70 per cent. the changed power factor of 70 per cent. must continue to exist for the time interval of operation of the meter in order to obtain an indication of 70 per cent. power factor. If the power factor improves before the expiration of the time interval of operation of the meter, a power factor between 70 per cent. and unity will be indicated, but it will be evident that the indicated power factor is the average or integrated power factor of the circuit during the time interval of operation of the meter. The time interval of operation of the meter may thus be adjusted as desired, and, accordingly, may be of only a few seconds' duration, in which case the meter is substantially an indicating power factor meter; that is, one which indicates instantaneous values of the power factor. The meter will, therefore, record power factor directly in instantaneous values if the disk armature is allowed to reach a balance or setting within a few seconds, and in integrated or average values when the disk armature rotates for a substantial length of time before reaching a balance or setting.

It will be evident from the foregoing description that it is possible with my novel and improved meter to record the average power factor of an electric circuit over given intervals of time. There is at present a tariff rate penalizing a consumer for a low power factor. Generally, it is not desired to penalize the consumer for a temporary or instantaneous low power factor, as, for example, a low power factor which exists for less than one minute, but it is rather the intention to penalize the consumer for continuing low power factors that exist for a substantial interval of time. The meter of my present invention is adapted for recording the average power factor over a given time, as, for example, during an interval of one-half hour. The minimum average power factor during any one of a number of substantial time intervals can thus be readily indicated by the meter herein described. Where such tariff contracts as above mentioned exist, the meter of my present invention may be employed to record either the minimum instantaneous power factor or the minimum average power factor over a substantial time interval.

I have explained my invention by illustrating and describing a specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. A power factor meter comprising means for producing a torque dependent upon the watt-energy flow in an electric circuit and adjustable means for producing a countertorque dependent upon the current flow in the circuit, a movable element adapted to be acted upon by both torques, mechanical means operatively connecting said movable element to said adjustable countertorque producing means whereby movement of said element operates to vary said countertorque, and means for indicating movement of said element.

2. A power factor meter comprising means for producing a torque dependent upon the watt-energy flow in an electric circuit and adjustable means for producing a countertorque dependent upon the current flow in the circuit, a rotatable element adapted to be acted upon by both torques, means including a reduction gear train operatively connecting said rotatable element to said adjustable countertorque producing means whereby said countertorque is varied as a function of the revolutions of said element, and means for indicating rotation of said element.

3. A power factor meter comprising means for developing two operatively opposing electrical torques, one of said torques being dependent upon the watt-energy flow in an electric circuit and the other of said torques being dependent upon the current-flow in the circuit, a movable element mounted within the influence of said torque developing means, mechanical means actuated by the movement of said element for varying one of said torques until it equals and balances the other torque, and means for indicating movement of said element.

4. A power factor meter comprising means for developing two operatively opposing and normally balanced torques, a movable element mounted within the influence of said torque developing means, means whereby said torques are unbalanced by a change in the power factor of an electric circuit, an adjustable shading coil adapted to vary one of said torques, and means operatively connecting said shading coil to said movable element so that movement of the element operates to adjust said shading coil to effect a balance of said torques.

5. A power factor meter comprising a rotatable element, means for producing a torque and a countertorque adapted to act upon said element, said torque being dependent upon the watt-energy flow in an electric circuit, means operatively connecting said element to said countertorque producing means whereby upon the occurrence of a predetermined change of the power factor of the circuit said rotatable element is required to make a given number of revolutions to cause said countertorque to equal and balance said torque, and means for indicating rotation of said element.

6. A power factor meter comprising a rotatable element, electric motive means adapted to exert two operatively opposing torques on said element, one of said torques being dependent upon the watt-energy flow in an electric circuit and the other torque being dependent upon the current flow in the circuit, means operatively connecting said rotatable element to said electric motive means so that upon the occurrence of a predetermined change of the power factor of the circuit said rotatable element is required to make a given number of revolutions to effect a balance of said two opposing torques, and means for indicating rotation of said element.

7. A power factor meter comprising a rotatable disk armature, induction motive means dependent upon the watt-energy flow in an electric circuit adapted to rotate said element in one direction, a second induction motive element dependent upon the current flow in the circuit having a shading pole and adapted to rotate said element in the reverse direction, and means operatively connecting said shading pole to said rotatable disk armature so that the torque due to said second induction motive element is increased when the armature rotates in one direction and decreased when the armature rotates in the opposite direction, and means for indicating rotation of said armature.

8. A power factor meter comprising a rotatable disk armature, an induction watt-hour meter element adapted to exert upon said armature a torque dependent upon the watt-energy flow in an electric circuit, an induction motor element of the shaded pole type adapted to exert upon said armature a countertorque dependent upon the current flow in the circuit, said motor element having a movable shading pole whereby the countertorque exerted upon said armature can be varied, gearing operatively connecting said armature to said movable shading pole so that rotation of the armature in one direction increases the countertorque of said motor element and rotation of said armature in the opposite direction decreases the countertorque of said motor element, and means for indicating rotation of said armature.

9. A power factor meter comprising a rotatable disk armature, an induction watt-hour meter element adapted to exert upon said armature a torque dependent upon the watt-energy flow in an electric circuit, an induction motor element adapted to exert upon said armature a countertorque dependent upon the current flow in the circuit, one of said induction elements having an adjustable shading pole, means operatively connecting said disk armature to said shading pole whereby rotation of the armature in either direction operates to balance the torques exerted upon said armature by said induction elements, and means for indicating rotation of said disk armature.

In witness whereof, I have hereunto set my hand this 2nd day of December, 1914.

CHESTER I. HALL.

Witnesses:
ROB MÜLLER,
K. D. FITCH.